(12) United States Patent
Chang et al.

(10) Patent No.: US 11,691,128 B2
(45) Date of Patent: Jul. 4, 2023

(54) THERMALLY STABLE MONOLITH CATALYSTS FOR METHANE REFORMING AND PREPARING METHOD OF THE SAME

(71) Applicant: KOREA RESEARCH INSTITUTE OF CHEMICAL TECHNOLOGY, Daejeon (KR)

(72) Inventors: Tae Sun Chang, Daejeon (KR); Ji Hoon Park, Daejeon (KR); Iljeong Heo, Daejeon (KR); Jung Hyun Park, Daejeon (KR); Young Woo You, Daejeon (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 711 days.

(21) Appl. No.: 16/613,119

(22) PCT Filed: May 15, 2018

(86) PCT No.: PCT/KR2018/005543
§ 371 (c)(1),
(2) Date: Nov. 13, 2019

(87) PCT Pub. No.: WO2018/212552
PCT Pub. Date: Nov. 22, 2018

(65) Prior Publication Data
US 2021/0077983 A1    Mar. 18, 2021

(30) Foreign Application Priority Data

May 18, 2017    (KR) .................. 10-2017-0061870

(51) Int. Cl.
*B01J 23/89*    (2006.01)
*B01J 21/02*    (2006.01)
(Continued)

(52) U.S. Cl.
CPC ........... *B01J 23/8913* (2013.01); *B01J 21/02* (2013.01); *B01J 27/02* (2013.01); *B01J 27/14* (2013.01);
(Continued)

(58) Field of Classification Search
USPC .......................................... 252/373
See application file for complete search history.

(56) References Cited

U.S. PATENT DOCUMENTS 4,451,517 A * 5/1984 Inoguchi ................. B01J 35/04
428/116
2006/0083672 A1* 4/2006 Daly ...................... B01J 23/42
423/418.2

FOREIGN PATENT DOCUMENTS

KR    1020120047215 A    5/2012
KR    101164024 B1    7/2012
(Continued)

OTHER PUBLICATIONS

Coke and sintering-resistant monolithic catalysts derived from in situ supported hydrotalcite-like films on Al Wires for dry reforming of methane Xianjun Du et al. Nanoscale, v2013, No. 5 pp. 2659-2663 (Year: 2013).*

(Continued)

*Primary Examiner* — Douglas B Call
(74) *Attorney, Agent, or Firm* — STIP Law Group, LLC (57) ABSTRACT

The present invention relates to a monolith catalyst for carbon-dioxide/methane reforming and a method of manufacturing the same, and more particularly to a novel monolith catalyst for a reforming reaction having improved thermal durability, configured such that a sintering inhibiting layer is formed by coating the surface of a monolith support with at least one element selected from the group consisting of Group 2, 3, 6, 13, 15 and 16 elements among elements in Period 3 or higher and an active catalyst layer is formed on (Continued)

the sintering inhibiting layer, thereby preventing carbon deposition and catalyst deactivation due to deterioration even upon reaction at high temperatures.

12 Claims, 2 Drawing Sheets (51) Int. Cl.
| | |
|---|---|
| B01J 27/02 | (2006.01) |
| B01J 27/14 | (2006.01) |
| B01J 35/04 | (2006.01) |
| B01J 35/10 | (2006.01) |
| B01J 37/02 | (2006.01) |
| B01J 37/08 | (2006.01) |
| C01B 3/40 | (2006.01) |

(52) U.S. Cl.
CPC ........... B01J 35/04 (2013.01); B01J 35/1014 (2013.01); B01J 37/0228 (2013.01); B01J 37/0236 (2013.01); B01J 37/0244 (2013.01); B01J 37/088 (2013.01); C01B 3/40 (2013.01); C01B 2203/0238 (2013.01); C01B 2203/1023 (2013.01); C01B 2203/1064 (2013.01); C01B 2203/1082 (2013.01); C01B 2203/1241 (2013.01)

(56) References Cited

FOREIGN PATENT DOCUMENTS

| KR | 1020140132893 A | 11/2014 |
|---|---|---|
| KR | 101480801 B1 | 1/2015 |
| KR | 1020150087341 A | 7/2015 |
| KR | 1020160095541 A | 8/2016 |
| KR | 1020180012558 A | 2/2018 |

OTHER PUBLICATIONS

International Search Report of PCT/KR2018/005543, dated Oct. 23, 2018, English translation.

Office Action from Korean Intellectual Property Office of 10-2017-0061870, dated Oct. 16, 2018.

Sooyeon Yeo et al, Improving coke-resistant and stability of Co—Ru—Zr on monoliths for dry reforming reaction, KSIEC Fall Meeting, 2016, pp. 26-28, The Korean Society of Industrial and Engineering Chemistry, Seoul, Republic of Korea.

Seonu Bang et al, The effect of acidity on Ni catalyst supported on P modified Al2O3 for the dry reforming of methane, 16th Korea-Japan Symposium on Catalysis & 3rd international Symposium of Institute for Catalysis, 2016. Sendai, Japan.

Hyojin Kim, Development of Monolithic Catalyst Sytem with Co—Ru—Zr for CO2 (dry) Reforming of Methane, Master's degree thesis, Jul. 2016, pp. 1-73, Korea University, Seoul, Republic of Korea.

Carlos Plana et al, Ni on Alumina-coated cordierite monoliths for in situ generation of CO-free H2 from ammonia, Journal of Catalysis, Jul. 20, 2010, pp. 228-235, vol. 275, Elsevier, Amsterdam, Netherlands.

Jung-Il Yang et al, Combined per-reformer/reformer system utilizing monolith catalysts for hydrogen-production, ScienceDirect, Apr. 17, 2011, pp. 8850-8856, vol. 36, Elsevier, Amsterdam, Netherlands.

S. Freni et al, Hydrogen production from methane through catalytic partial oxidation reactions, Journal of Power Sources, 2000, pp. 28-38, vol. 87, Elsevier, Amsterdam, Netherlands.

* cited by examiner

THERMALLY STABLE MONOLITH CATALYSTS FOR METHANE REFORMING AND PREPARING METHOD OF THE SAME

CROSS-REFERENCE TO RELATED APPLICATIONS

This application is the U.S. National Phase under 35 U.S.C. 371 of International Application No. PCT/KR2018/005543 filed on May 15, 2018, which in turn claims the benefit of Korean Application No. 10-2017-0061870, filed on May 18, 2017, the disclosures of which are incorporated by reference into the present application.

TECHNICAL FIELD

The present invention relates to a monolith catalyst for a reforming reaction and, more particularly, to a novel monolith catalyst for reforming methane, which is capable of preventing catalyst particles from growing during the reforming of methane and also preventing carbon deposition and catalyst deactivation due thereto, thereby realizing an extended catalyst lifetime.

BACKGROUND ART

With global warming, governments all over the world have announced plans to reduce greenhouse gases, and the Korean government has set a target of reducing greenhouse gas emissions to 37% of projected emissions for the year 2030, thus increasing the burden on industry.

As an important alternative to greenhouse gas reduction, recycling emitted carbon dioxide into resources, rather than reducing carbon dioxide emissions, is regarded as important. One of the ways to recycle carbon dioxide into resources is to produce synthesis gas by reforming methane using carbon dioxide.

Meanwhile, the reaction for reforming methane using carbon dioxide is advantageous because both carbon dioxide and methane, which are causes of global warming, may be simultaneously removed, and also because synthesis gas ($H_2$:CO=1:1) having high carbon monoxide content may be produced compared to when using other reforming methods, whereby the produced synthesis gas may be used as a reactant for processes of producing high value-added chemicals, such as oxo alcohol, dimethyl ether (DME), polycarbonate (PC), acetic acid, etc. The reaction for reforming methane using carbon dioxide is represented in the following scheme.

<Scheme>

This carbon dioxide reforming reaction is a very strong endothermic reaction, and the equilibrium conversion, which is the theoretical maximum conversion at a given temperature, increases with an increase in temperature, thus causing the reaction to occur at temperatures of 650° C. or more, and usually at high temperatures of 850° C. or more. However, the reaction at high temperatures may easily sinter and oxidize the catalyst particles (active component), which reduces the number of active sites of the catalyst, causes carbon deposition, and seriously degrades catalytic activity. Hence, it is necessary to develop catalysts for reforming reactions having improved thermal durability.

In particular, a reforming reaction needs a catalyst having high mechanical and thermal durability in the high-temperature range of the reforming reaction, as well as treating large amounts of greenhouse gases. According to conventional documents, many attempts are made to develop techniques for increasing catalytic activity by adjusting the components and amounts of the catalyst composition to improve the performance of the catalyst.

Korean Patent Application Publication No. 10-2012-0047215 discloses a monolith catalyst and the use thereof, in which the monolith catalyst includes a monolith composed of a catalytically inert material having a low BET surface area and a catalyst layer which is applied onto the monolith and includes, on an oxidic support material, at least one noble metal selected from the group consisting of Group VIII noble metals on the periodic table, optionally tin and/or rhenium, and optionally additional metals.

Korean Patent Application Publication No. 10-2015-0087341 discloses a zoned catalyst on a monolithic substrate including a first zone and a second zone, in which the first zone includes a platinum group metal loaded on a support and a first base metal oxide selected from the group consisting of iron oxide, manganese oxide, copper oxide, zinc oxide, nickel oxide and mixtures thereof, or a first base metal selected from the group consisting of iron, manganese, copper, zinc, nickel, and mixtures thereof loaded on an inorganic oxide, and the second zone includes copper or iron loaded on zeolite and a second base metal oxide selected from the group consisting of iron oxide, manganese oxide, copper oxide, zinc oxide, nickel oxide and mixtures thereof, or a second base metal selected from the group consisting of iron, manganese, copper, zinc, nickel, and mixtures thereof loaded on an inorganic oxide.

With regard to conventional catalysts for reforming methane, Korean Patent No. 1164024 discloses a cobalt-based catalyst for reforming methane using carbon dioxide, which has a remarkably extended lifetime through a low-temperature reaction and high reaction activity compared to existing nickel catalysts for reforming reactions. Such a catalyst exhibits high carbon monoxide production and is stable even upon long-term operation.

Korean Patent No. 1480801 discloses a monolith catalyst for carbon dioxide/methane reforming and a method of manufacturing the same. Here, the method of manufacturing the monolith catalyst for reforming methane using carbon dioxide includes mixing and impregnating a carrier with a precursor solution, impregnating a monolith support with the mixed and impregnated solution, drying the same, and firing the monolith support impregnated with the mixed and impregnated solution.

In the reaction for reforming carbon dioxide and methane, the monolith catalyst is able to maintain high activity for a relatively long time compared to existing granular catalysts, making it possible to produce synthesis gas that is stable for a long period of time. Furthermore, the monolith is advantageous in that pressure loss is relatively low by virtue of the structural features thereof, thus facilitating commercialization of the process, but problems such as carbon deposition and catalyst deactivation due to sintering and oxidation of active components under high-temperature reaction conditions (800° C. or more) still remain.

Korean Patent Application No. 10-2016-0095541, filed by the present applicant, discloses a heat-resistant monolith catalyst, which includes existing catalyst particles and a barrier component containing Group 1A to 5A metals, thereby preventing carbon deposition during the reforming reaction, ameliorating catalyst deactivation due to deterioration, and improving thermal durability. In the above application, the barrier component such as aluminum, etc. is supported together with the active metal on the support so that the barrier metal is present between the active metal particles, whereby the barrier metal functions as a diffusion barrier to thus prevent the active metal particles from growing due to sintering during the high-temperature reaction, thereby suppressing catalyst coking and improving thermal stability, ultimately preventing the deactivation of the catalyst.

Rather than simultaneously supporting the active metal and the barrier metal as described above, however, when the barrier metal is first applied on the monolith support to thus form a sintering inhibition layer, and the active metal is then supported on the monolith support coated with the sintering inhibition layer, it is confirmed that the blocking of the surface of the active metal by the barrier metal may be minimized and also that the active metal particles may be prevented from growing due to sintering during the high-temperature reaction, which culminates in the present invention.

DISCLOSURE

Technical Problem

Accordingly, the present invention has been made keeping in mind the problems with conventional monolith catalysts for reforming reactions, such as low heat resistance and low catalytic activity attributed to coking, and an objective of the present invention is to provide a monolith catalyst for reforming methane using carbon dioxide, which is capable of exhibiting stable activity and improved coking resistance of the catalyst by inhibiting the sintering of active catalyst particles even under high-temperature reaction conditions (800° C. or more), and a method of manufacturing the same.

Technical Solution

In order to accomplish the above objective, an aspect of the present invention provides a monolith catalyst for reforming methane; the monolith catalyst including a monolith support, a sintering inhibition layer formed by coating the surface of the monolith support with at least one element selected from the group consisting of Group 2, 3, 6, 13, 15 and 16 elements among elements in Period 3 or higher, and an active metal layer disposed on the sintering inhibition layer, in which a composition for the active metal layer is represented by Chemical Formula 1 below.

$$a(X)-b(Y) \quad \text{[Chemical Formula 1]}$$

In Chemical Formula 1, X is a catalytically active component composed of any one or a mixture of two or more selected from among Co, Ni, Ru, and Rh, Y is a promoter Zr, and a and b are weight proportions of X and Y, respectively, a being 1, and b ranging from 0.2 to 1.5.

In a preferred embodiment of the present invention, the sintering inhibition layer is formed by coating the surface of the monolith support with at least one selected from among Ca, Al, S, P, Y, and W.

In a preferred embodiment of the present invention, the monolith support has 100 to 400 cpsi (cells per square inch).

Another aspect of the present invention provides a method of manufacturing a monolith catalyst for reforming methane, the method including a) dipping a monolith support in a precursor solution of at least one element selected from the group consisting of Group 2, 3, 6, 13, 15 and 16 elements among elements in Period 3 or higher, b) drying the monolith support obtained in step a), c) firing the monolith support dried in step b) to afford the monolith support, the surface of which is coated with a sintering inhibition layer, d) preparing a metal precursor solution including a compound of Chemical Formula 1, e) supporting the metal precursor solution of step d) on the monolith support coated with the sintering inhibition layer obtained in step c), f) drying the monolith support having the compound of Chemical Formula 1 supported thereon obtained in step e), and g) firing the monolith support dried in step f) to afford the monolith support on which a catalytically active layer including the compound of Chemical Formula 1 is formed.

In a preferred embodiment of the present invention, the precursor in step a) is a precursor of Al, P, or S.

In a preferred embodiment of the present invention, the monolith support is composed of a ceramic, silicon carbide, or metal component having a specific surface area of 10 $m^2/g$ or less.

In a preferred embodiment of the present invention, the firing in step c) is performed at 300 to 600° C. for 4 to 7 hr, and the firing in step g) is performed at 300 to 600° C. for 4 to 7 hr.

Still another aspect of the present invention provides a method of manufacturing synthesis gas, the method including reforming a gas mixture including carbon dioxide and methane using the catalyst manufactured according to the present invention to thereby produce synthesis gas including carbon monoxide and hydrogen.

Here, the reaction temperature under atmospheric pressure may be 900 to 1200° C., and the space velocity of the gas mixture may be 3800 to 4600 $h^{-1}$.

Advantageous Effects

According to the present invention, a monolith catalyst for reforming methane is configured such that a sintering inhibition layer is formed on the surface of a monolith support, and an active catalyst layer is formed on the sintering inhibition layer, thereby preventing the sintering of the active catalyst layer and ensuring the maximum reaction area of the active catalyst layer.

Moreover, sintering of the active catalyst layer can be prevented by the sintering inhibition layer, thus suppressing the deactivation of active catalyst particles and carbon deposition and maintaining the activity of the monolith catalyst even after long-term reaction at a high temperature, ultimately exhibiting superior heat resistance and stable activity.

*DESCRIPTION OF THE REFERENCE NUMERALS IN THE DRAWINGS

10: barrier metal particles
20: active catalyst particles
30: sintering inhibition layer

BEST MODE

Hereinafter, a detailed description will be given of a monolith catalyst for a reforming reaction and a method of manufacturing the same according to preferred embodiments of the present invention with reference to the appended drawings so that the present invention may be easily carried out by those skilled in the art to which the present invention belongs.

In the drawings of the present invention, the sizes or dimensions of structures are shown in an enlarged or reduced state compared to actual sizes or dimensions thereof for clarification of the present invention, and known configurations are omitted to show characteristic features, so the present invention is not limited to the drawings.

In the following description of preferred embodiments of the present invention, detailed descriptions of known functions and components incorporated herein will be omitted when the same may make the subject matter of the present invention unclear.

An aspect of the present invention pertains to a monolith catalyst for reforming methane, configured such that an active component is supported on a monolith support, and particularly to a monolith catalyst for a reforming reaction, which includes a sintering inhibition layer (A) applied on the surface of a monolith support and a catalytically active layer (B) formed on the sintering inhibition layer and configured to include a compound represented by Chemical Formula 1 below.

$$a(X)-b(Y) \qquad \text{[Chemical Formula 1]}$$

In Chemical Formula 1, X is a catalytically active component composed of any one or a mixture of two or more selected from among Co, Ni, Ru, and Rh, Y is a promoter Zr, and a and b are weight proportions of X and Y, respectively, a being 1, and b ranging from 0.2 to 1.5.

Preferably useful as the catalytically active component is a mixture of Co and Ru. Here, the molar ratio of Co and Ru, which are mixed, is 1:0.01-0.2 (Co:Ru).

A catalyst that is conventionally used in a reaction for reforming methane using carbon dioxide is known to be used in the form of a compound by mixing an active component composed of a transition metal, such as cobalt (Co), nickel (Ni), etc., a noble metal, such as platinum (Pt), palladium (Pd), rhodium (Rh), iridium (Ir) or ruthenium (Ru), and a promoter, such as zirconium (Zr), lanthanum (La), etc. In order to load the catalyst composition on the support, a carrier such as alumina, silica, etc. is mainly used.

In the catalyst for reforming methane, which is composed of the mixture structure described above, various methods such as changing the amounts of individual components of the mixture or using different treatment methods have been applied, but problems in which the catalytic activity deteriorates during the reforming reaction under high-temperature conditions have not been overcome.

In the present invention, therefore, in order to improve thermal stability at high temperatures and inhibit a sintering phenomenon, the surface of the monolith catalyst support is coated with at least one element selected from the group consisting of Group 2, 3, 6, 13, 15 and 16 elements among elements in Period 3 or higher to form a sintering inhibition layer, and then an active catalyst layer having the composition of Chemical Formula 1 is applied on the sintering inhibition layer, thereby preventing catalytically active component particles from growing due to sintering or the like of the active component particles at a high temperature (800° C. or more) at which the methane reforming reaction is actually carried out, ultimately increasing the heat resistance and coking resistance of the catalyst.

In the present invention, the sintering inhibition layer is preferably formed through a coating process using at least one selected from among Ca, Al, S, P, Y, and W, and more preferably using Al, P, or S.

In a preferred embodiment of the present invention, the metal for the sintering inhibition layer may be applied by dipping the monolith support in a precursor solution of the metal in at least one of organic solvent and water, but the present invention is not limited thereto, and a typical coating process, such as spin coating, spray coating, chemical vapor deposition, etc., may be performed.

Figure 1:
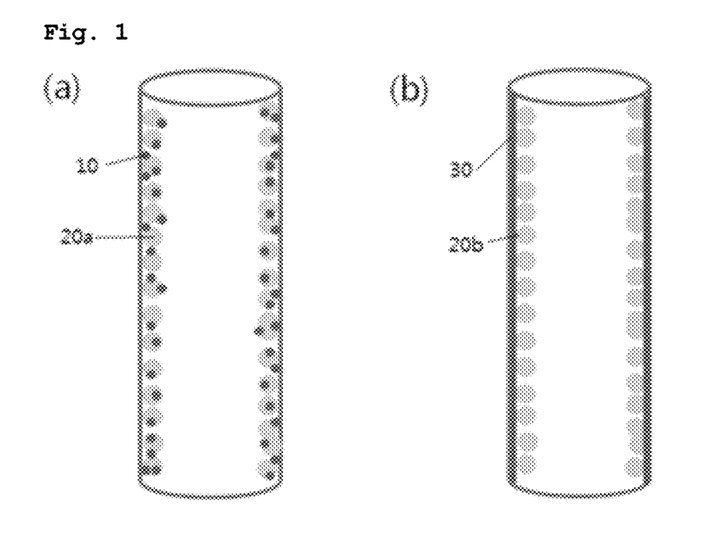
FIG. 1a schematically shows a conventional monolith catalyst for a reforming reaction, which is coated with a barrier metal (sintering inhibition particles) and an active catalyst.
FIG. 1b schematically shows a monolith catalyst for reforming methane using carbon dioxide according to the present invention, which is coated with a sintering inhibition layer and an active catalyst.

FIG. 1 compares the conventional sintering inhibition process using a barrier metal and the sintering inhibition process according to the present invention. As shown in FIG. 1(a), the barrier metal 10 is present between the catalytically active particles 20a and may thus function as a kind of diffusion barrier to thereby inhibiting the sintering and growth of the catalytically active particles. In this case, since the surface of the catalytically active particles is blocked with the barrier metal, the surface area of the active particles may be reduced, which is undesirable. In contrast, as shown in FIG. 1(b), the monolith catalyst, according to the present invention, is configured such that the surface of the monolith support is coated with the sintering inhibition layer 30, and the catalytically active particles 20b are located on the sintering inhibition layer 30 to thus form the catalytically active layer, whereby the sintering of the catalytically active particles may be inhibited, and the reduction in the surface area of the active particles by the barrier metal as in the conventional case does not occur.

The sintering inhibition layer 30 is present between the surface of the monolith support and the catalytically active layer and thus plays a role in inhibiting migration and sintering of the catalytically active particles at high temperatures. This is deemed to be because the catalytically active metal interacts with the metal for the sintering inhibition layer to thus form a strong bond, thereby suppressing diffusion thereof even at high reaction temperatures. Accordingly, in the methane reforming reaction, which occurs under high-temperature reaction conditions, a sintering phenomenon may be inhibited by preventing the diffusion/migration of the catalytically active metal particles, thus maintaining the dispersibility of the catalytically active component and preventing carbon deposition due to the growth of catalyst particles.

Moreover, the sintering inhibition layer 30 is disposed between the surface of the monolith support and the catalytically active layer and thus functions to fix the active metal, whereby sufficient contact area between the catalytically active metal and the sintering inhibition layer 30 may be ensured and moreover, the remaining surface of the catalytically active layer is completely opened, ultimately decreasing the reduction in the number of catalytically active sites necessary for the reforming reaction compared to when the barrier metal for preventing the sintering of the catalytically active metal is simultaneously supported.

Another aspect of the present invention pertains to a method of manufacturing the monolith catalyst for a reforming reaction, the method including a) dipping a monolith support in a precursor solution of at least one element selected from the group consisting of Group 2, 3, 6, 13, 15 and 16 elements among elements in Period 3 or higher in order to form a sintering inhibition layer for an active metal, b) drying the monolith support obtained in step a), c) firing the monolith support dried in step b) to afford the monolith support, the surface of which is coated with a sintering inhibition layer, d) preparing a metal precursor solution including a compound of Chemical Formula 1, e) supporting the metal precursor solution of step d) on the monolith support coated with the sintering inhibition layer obtained in step c), f) drying the monolith support having the compound of Chemical Formula 1 supported thereon obtained in step e), and g) firing the monolith support dried in step f) to afford the monolith support on which a catalytically active layer including the compound of Chemical Formula 1 is formed.

According to the present invention, the sintering inhibition layer may be formed through a coating process by dipping the monolith support in the precursor solution of the metal constituting the sintering inhibition layer.

The element for the sintering inhibition layer is preferably Al, P, or S in order to realize desired catalytic activity and stability during the reforming of methane, and the concentration of the precursor preferably falls in the range of 0.01 to 3 M in order to obtain desired support coating efficiency.

Next, the monolith support coated with the metal precursor solution is dried. Here, the coated monolith support may be dried in an oven at 80 to 120° C. for about 1 hr.

According to the present invention, the dried monolith support is fired at a high temperature, for example, 300 to 600° C., for 4 to 7 hr, whereby the sintering inhibition layer is preferably formed on the monolith support. Here, if the firing temperature is lower than 300° C. or the firing time is shorter than 4 hr, the solvent or the precursor component used during the manufacturing process may be left behind, undesirably causing side reactions during the formation of the active catalyst layer. On the other hand, if the firing temperature is higher than 600° C. or the firing time is longer than 7 hr, it is difficult to form a uniform sintering inhibition layer. Hence, it is preferred that the firing be performed in the above temperature range.

In a preferred embodiment of the present invention, the sintering inhibition layer may be formed by repeating steps a) and b) or steps a) to c) so that the monolith support is coated with the metal in the desired amount.

The sintering inhibition layer is formed using the method of the present invention, thereby exhibiting the sintering inhibition function. The introduction of an alumina layer by wash-coating a monolith support with an alumina sol or the like does not exhibit the sintering inhibition function as in the present invention.

According to the present invention, it is easy to introduce the active catalyst layer even without the use of a carrier such as silica sol or alumina sol.

In order to uniformly disperse the active catalyst composition of Chemical Formula 1, the monolith catalyst support, for example, a monolith support having a low specific surface area of 10 $m^2/g$ or less, such as ceramic, silicon carbide, or metal component, may be used. Such a monolith support preferably has a honeycomb structure.

A monolithic catalyst having a honeycomb structure, configured such that rod-shaped hollow spaces are connected to each other, enables heat to be easily transferred through the inner and outer walls thereof so that the temperature of the catalyst is maintained constant and, moreover, is suitable for treating a reactant at a high flow rate by virtue of the low-pressure drop. In addition, the monolithic catalyst has a compact structure and thus has a high surface area per unit volume and shows excellent wear resistance. This monolithic catalyst having a honeycomb structure is optimized for high flow-rate reaction and enhanced catalyst durability by manifesting high thermal stability and a low carbon deposition rate because of fast mass transfer.

The monolith support may have a gas flow channel of 100 to 400 cpsi. In the case of the gas flow channel of 100 cpsi, the geometric surface area may decrease, and in the case of more than 400 cpsi, the geometric surface area increases, and the catalyst may be used more effectively, but a high-pressure drop may occur due to the difficult manufacturing processes and reactions.

The active catalyst layer includes a composition represented by Chemical Formula 1, and may further include a transition metal and a noble metal typically useful for a catalyst for a reforming reaction.

The metal precursor of the compound of Chemical Formula 1 in step d) is not particularly limited, so long as it is typically useful in the art. Examples of individual metal precursors are set forth below.

Examples of a cobalt compound, which is a cobalt precursor, may include $Co(NO_3)_2$, $Co(OH)_2$, $CoCl_2$, $CoSO_4$, $Co_2(SO_4)_3$, $CoF_3$, $CoCO_3$, etc. and are typically used in the form of nitrate.

Examples of a nickel compound, which is a nickel precursor, may include $Ni(NO_3)_2$, $NiCl_2$, $NiSO_4$, $Ni_2(SO_4)_3$, $NiCO_3$, etc., and are typically used in the form of nitrate.

Examples of a ruthenium compound, which is a ruthenium precursor, may include ruthenium salts, such as $RuCl_3 \cdot nH_2O$, $Ru(NO_3)_3$, $Ru_2(OH)_2Cl_4 \cdot 7NH_3 \cdot 3H_2O$, $K_2(RuCl_5 (H_2O))$, $(NH_4)_2 (RuCl_5(H_2O))$, $K_2(RuCl_5(NO))$, $RuBr_3 \cdot nH_2O$, $Na_2RuO_4$, $Ru(NO)(NO_3)_3$, etc. Preferably useful is $Ru(NO)(NO_3)_3$ or $Ru(NO_3)_3$ in view of handling.

Examples of a platinum compound, which is a platinum precursor, may include platinum salts, such as $PtCl_4$, $H_2PtCl_4$, $H_2PtCl_6$, $K_2PtCl_4$, $K_2PtCl_6$, $Pt(C_5H_7O_2)_2$, etc. $H_2PtCl_6$ is mainly used.

Examples of a zirconium compound, which is a zirconium precursor, may include $ZrCl_4$, $ZrCl_2$, $ZrO(NO_3)_2 \cdot H_2O$, $ZrO_2$, $Zr(OH)_4$, $ZrClOH$, $Zr(NO_3)_4 \cdot 5H_2O$, $ZrOCl_2$, $Zr(SO_4)_2$, etc., and $Zr(NO_3)_4 \cdot 5H_2O$ or $ZrOCl_2$ is preferably used in view of handling.

According to the present invention, the active catalyst metal precursor solution is supported on the monolith support coated with the sintering inhibition layer (A), and the monolith support having the active catalyst metal precursor solution supported thereon is dried. Here, the supported monolith support is preferably dried at 80 to 120° C. for about 1 hr.

According to the present invention, the dried monolith support is fired, for example, at 300 to 600° C. for 4 to 7 hr, thus manufacturing a monolith catalyst. If the firing is performed at a temperature lower than 300° C. or for a time shorter than 4 hr, the properties of the catalyst do not change, but the catalyst merely becomes dry, and thus chemical bonding of the catalyst is not achieved undesirably deteriorating catalytic activity. On the other hand, if the firing is performed at a temperature higher than 600° C. or for a time longer than 7 hr, the dispersibility of the catalyst particles may decrease. Hence, the firing process is performed under the above temperature and time conditions.

In a preferred embodiment of the present invention, the active catalyst layer included in the monolith catalyst for reforming methane accounts for 0.5 to 5 parts by weight based on 100 parts by weight of the monolith catalyst support.

According to the present invention, if the amount of the active catalyst layer is less than 0.5 parts by weight, there is not enough of the active component to show methane-reforming reactivity using carbon dioxide, undesirably resulting in decreased reactivity. On the other hand, if the amount thereof is greater than 5 parts by weight, the catalytic activity may decrease due to an increase in the catalyst particle size, and excessive coking may occur. Hence, it is preferred that the amount of the active catalyst layer fall in the above range.

In a preferred embodiment of the present invention, the active catalyst layer is preferably introduced by repeating steps e) and f) or steps e) to g) so that the active catalyst metal is supported in the desired amount on the monolith support.

The monolith catalyst manufactured according to the present invention remains active even at a high temperature (800° C. or more) in the carbon-dioxide/methane reforming reaction and is capable of maintaining the dispersibility of the catalyst component, thereby facilitating the continuous use of the monolith catalyst and generating economic benefits.

A better understanding of the present invention will be given through the following examples, which are not to be construed as limiting the present invention.

Examples 1 to 3: Manufacture of
Co—Ru—Zr/Al/Monolith,
Co—Ru—Zr/P/Monolith, Co—Ru—Zr/S/Monolith
Catalyst The precursors of individual components used to manufacture the catalyst according to the present invention are as follows:

Cobalt nitrate hexahydrate ($Co(NO_3)_2 \cdot 6H_2O$, Samchun Chem., 97%), Ruthenium nitrosyl nitrate ($Ru(NO)(NO_3)_3$, Stream Chem., 99%), Zirconium chloride oxide octahydrate ($ZrCl_2 \cdot 8H_2O$, Junsei, 99%), Aluminum nitrate nonahydrate ($Al(NO_3)_3 \cdot 9H_2O$, Junsei, 98%), Phosphoric acid ($H_3PO_4$, Samchun, 85%), and Sulfuric acid ($H_2SO_4$, Samchun, xx %).

A monolith of 200 cpsi was cut to a diameter of 1 cm and a height of 2 cm, and was then used as a support for a catalyst. The cut monolith was dipped in a solution of each of a 0.1 M aluminum precursor (Example 1), a 1 M phosphorus precursor (Example 2), and a 1 M sulfur precursor (Example 3) so that the monolith having a honeycomb structure was coated with each of aluminum, phosphorus, and sulfur, after which the coated monolith was dried in an oven at 100° C. for about 1 hr. The dried monolith was fired at 400° C. for 6 hr and thus used as a support for a Co—Ru—Zr catalyst.

The coated monolith thus prepared was subjected to solution coating with a solution in which a Co—Ru—Zr active component was dissolved, followed by drying in an oven at 100° C. for about 1 hr. The coating and drying processes were repeated several times, thus manufacturing a catalyst in which the weight of the catalyst component was about 2 wt % based on the total weight thereof. The monolith coated with the Co—Ru—Zr catalyst component was fired at 400° C. for 6 hr, thereby manufacturing a monolith catalyst for a reforming reaction according to the present invention.

Examples 4 and 5: Manufacture of
Co—Ru—Zr/P/Monolith Catalyst

A monolith having a honeycomb structure was coated with a phosphorus precursor solution at different concentrations of 0.5 M (Example 4) and 2 M (Example 5) and was then dried in an oven at 100° C. for about 1 hr. The dried monolith was fired at 400° C. for 6 hr and thus used as a support for a Co—Ru—Zr catalyst. The method of supporting Co—Ru—Zr and the supported amount thereof were the same as in Example 1.

Comparative Example 1: Manufacture of
Co—Ru—Zr/Monolith Catalyst

A non-treated monolith was coated with a solution in which a Co—Ru—Zr active component was dissolved, followed by drying in an oven at about 100° C. for about 1 hr. The coating and drying processes were repeated several times, thus manufacturing a catalyst in which the weight of the catalyst component was about 2 wt % based on the total weight thereof. The monolith coated with the Co—Ru—Zr catalyst component was fired at 400° C. for 6 hr, thereby manufacturing a monolith catalyst.

Test Example 1: Evaluation of Catalyst
Performance

In order to evaluate the performance of the catalysts manufactured in Examples according to the present invention and Comparative Example, the reaction for reforming methane and carbon dioxide was carried out as follows. The results are shown in FIGS. 2 and 3.

For evaluation of the catalyst performance, the monolith catalyst of Examples and Comparative Example was placed in a tubular fixed-bed reactor having an inner diameter of 2 cm made of quartz and equipped with an external heating system, and the temperature was elevated to a target reaction temperature while inert gas was allowed to flow therein. After the temperature reached the target reaction temperature, a methane/carbon-dioxide gas mixture, mixed at a molar ratio of 1:1, was fed into the reactor at a space velocity of 4,200 $h^{-1}$, so that a catalytic reaction was carried out. Here, the catalytic reaction conditions were atmospheric pressure and a reaction temperature of 1,000° C., and the gas discharged after the reaction was analyzed using a gas chromatography system with a thermal conductivity detector.

Figure 2:
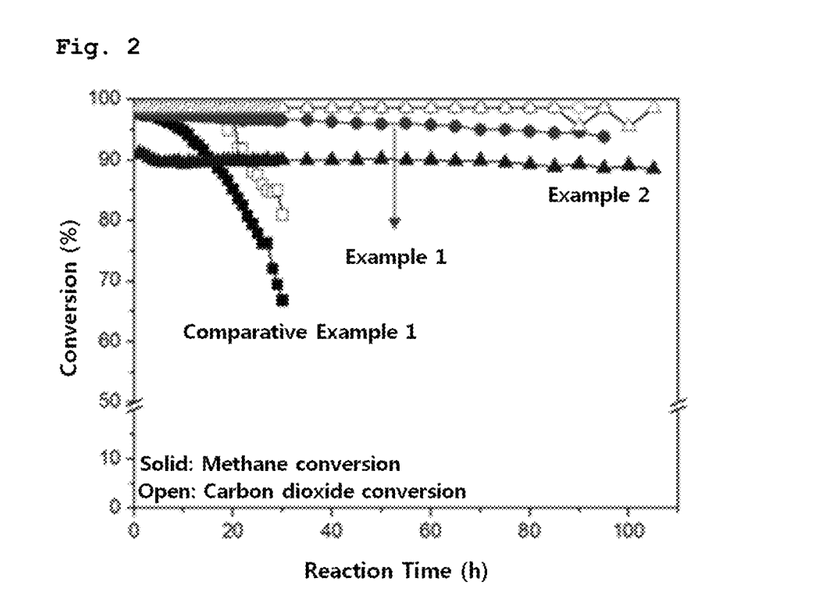
FIG. 2 shows the conversion of methane and carbon dioxide in the presence of the monolith catalysts of Examples 1 and 2 and Comparative Example 1.
Figure 3:
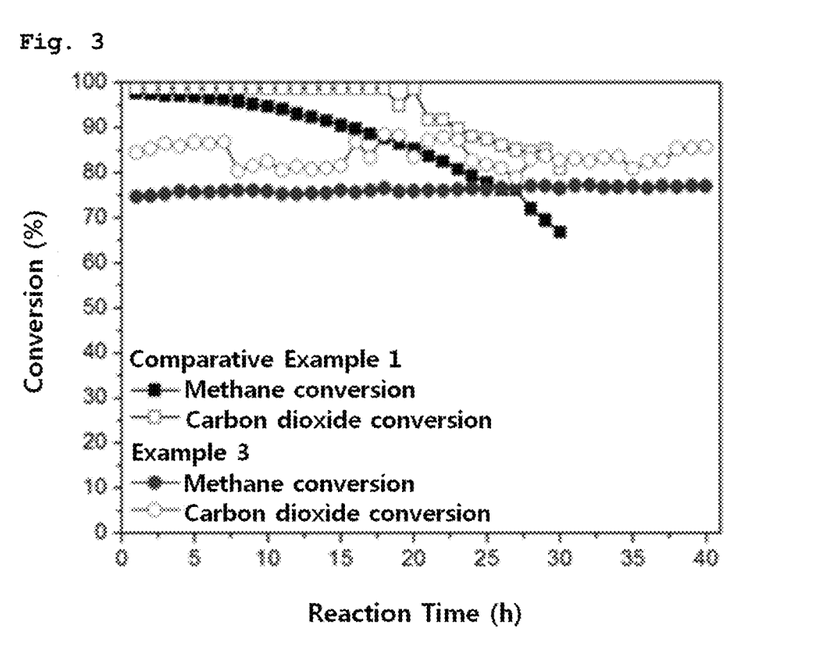
FIG. 3 shows the conversion of methane and carbon dioxide in the presence of the monolith catalysts of Example 3 and Comparative Example 1.

As shown in FIG. 2, the monolith catalyst of Example 1 of the present invention exhibited methane and carbon dioxide conversion of 100% at the beginning of the reforming reaction. As the reaction proceeded, a decrease in methane conversion was observed, but stable activity was shown for 100 hr, and carbon dioxide conversion was maintained at 100% during the reaction. The reason why the carbon dioxide conversion is higher than the methane conversion is due to the reduction of carbon dioxide emission by reverse water-gas shift reaction ($CO_2 + H_2 \leftrightarrow CO\ H_2O$).

The monolith catalyst of Example 2 showed a methane conversion of about 92% and a carbon dioxide conversion of 100% at the beginning of the reforming reaction. 5 hr after the reaction, a decrease in methane conversion of about 3% was observed, but stable methane and carbon dioxide conversion was then observed during the reforming reaction for 100 hr or more. The methane conversion in the presence of the monolith catalysts of Examples 1 and 2 varied slightly depending on the type of catalyst that was used, but the carbon dioxide conversion reached a thermodynamic equilibrium under the influence of the high reaction temperature, resulting in 100% conversion during the reaction time.

The monolith catalyst of Comparative Example 1 exhibited methane and carbon dioxide conversion of 100% at the beginning of the reaction. As the reaction proceeded, a decrease in conversion was observed, and after a reaction time of 30 hr, the methane conversion was 66.8%, and the carbon dioxide conversion was 81.0%.

As is apparent from Table 1 below, based on the results of the reforming reaction in the presence of monolith catalysts obtained by varying the mol concentration of phosphoric acid used to manufacture the monolith catalyst of Example 2, the phosphoric acid concentration upon surface treatment affected methane and carbon dioxide conversion and reaction stability. The monolith catalyst (Example 5) treated with 2 M phosphoric acid exhibited initial methane and carbon dioxide conversion of 62.3% and 74.5%, respectively, which are evaluated to be lower than those of the monolith catalysts of Example 2 and Comparative Example. However, compared to the monolith catalyst of Comparative Example 1 not treated with phosphoric acid, stable catalytic activity was exhibited for 30 hr or more. As shown in Table 1 below, the phosphoric acid concentration is regarded as affecting the activity and stability of the monolith catalyst, and the appropriate phosphoric acid concentration is determined to be 1 M.

TABLE 1

| No. | P concentration (M) | CH$_4$ Conversion (%) 1 hr | 30 hr | CO$_2$ Conversion (%) 1 hr | 30 hr |
|---|---|---|---|---|---|
| Example 2 | 1 | 91.1 | 90.0 | 100 | 100 |
| Example 4 | 0.5 | 85.1 | 84.4 | 100 | 100 |
| Example 5 | 2 | 62.3 | 72.2 | 74.5 | 85.7 |
| Comparative Example 1 | — | 97.6 | 66.8 | 100 | 81.0 |

FIG. 3 shows the activity of the monolith catalyst of Example 3 of the present invention on the reforming reaction. The catalyst of Example 3 using the monolith support treated with sulfur exhibited methane and carbon dioxide conversion of 75% and 85%, respectively, in the initial reforming reaction. As shown in FIG. 3, the monolith catalyst of Example 3 manifested low initial activity compared to that of the monolith catalyst of Comparative Example 1, but the catalytic activity was stable to the extent that changes in the activity thereof were low over time. Rather, as the reaction proceeded, an increase in methane and carbon dioxide conversion was observed. This is deemed to be because, during the reaction, Co—Ru—Zr, which is the active phase of the sulfur-treated monolith catalyst, is changed to an activated state, and thus activation proceeds through interaction with sulfur on the surface of the catalyst. Therefore, the sulfur-treated monolith catalyst can also be considered a candidate for maintaining and improving catalytic activity and stability.

Test Example 2: Carbon Analysis of Catalyst after Reaction

In order to compare the amounts of deposited carbon after reaction using the monolith catalysts (Examples 1 and 2) coated with aluminum or phosphorus and then supported with Co—Ru—Zr and the Co—Ru—Zr catalyst supported on the non-treated monolith (Comparative Example 1), the following elemental analysis was performed. After the reaction for reforming methane and carbon dioxide under the reaction conditions of the above Test Example, the amount of carbon deposited in the monolith catalysts recovered in Examples 1 and 2 and Comparative Example 1 was quantified using a Thermo Scientific FLASH EA-2000. The results are shown in Table 2 below.

As is apparent from Table 2 below, in the monolith catalyst used as the support after coating with aluminum or phosphorus, the total amount of deposited carbon was observed at the negligible level of 0.03%, and the amount of deposited carbon in the Co—Ru—Zr catalyst supported on the non-treated monolith was relatively large, namely 0.2%.

In the reaction for reforming methane, when the active metal component is sintered, and thus the particle size is increased, carbon deposition occurs excessively, and methane conversion is rapidly decreased. Based on the results of FIGS. 2 and 3 and Table 2, in Examples in which the active metal was supported on the monolith coated with Al, P, or S, the catalytic activity was maintained for a long time, unlike Comparative Example and the amount of deposited carbon was low even for a much longer reaction time, indicating that the catalyst manufactured by the method of the present invention prevented sintering of the active metal, thus improving catalytic activity, stability, and coking resistance.

TABLE 2

| No. | Supported amount (wt %) | Monolith form | Amount of deposited carbon (%), (Reaction time) |
|---|---|---|---|
| Example 1 | 2 | Al/monolith | 0.03 (100 hr) |
| Example 2 | 2 | P/monolith | — (100 hr) |
| Comparative Example 1 | 2 | Monolith | 0.2 (40 hr) |

INDUSTRIAL APPLICABILITY

According to the present invention, the monolith catalyst for reforming methane is configured such that a sintering inhibition layer is formed on the surface of a monolith support, and an active catalyst layer is provided on the sintering inhibition layer, thereby preventing the sintering of the active catalyst layer and ensuring the maximum reaction area of the active catalyst layer.

In addition, sintering of the active catalyst layer can be prevented by the sintering inhibition layer, thus inhibiting the deactivation of the active catalyst particles and carbon deposition, and even after reaction at a high temperature for a long period of time, the activity of the monolith catalyst can be maintained, and thus the monolith catalyst of the invention can exhibit superior heat resistance and stable activity and is industrially applicable.

The invention claimed is:
1. A monolith catalyst for reforming methane, the monolith catalyst comprising:
   a monolith support;
   a sintering inhibition layer formed by coating a surface of the monolith support with at least one element, wherein the at least one element is selected from elements belonging to Group 13, Group 15, or Group 16, and the at least one element belongs to Period 3 or higher; and
   an active metal layer disposed on the sintering inhibition layer, wherein, the sintering inhibition layer is coated on the surface of the monolith support without using an alumina sol, the active metal layer is sequentially present on the sintering inhibition layer, content of the active metal layer has 0.5 to 2 parts by weight based on 100 parts by weight of the monolith support, and a composition for the active metal layer is represented by Chemical Formula 1 below, $$a(X)-b(Y) \qquad \text{[Chemical Formula 1]}$$

wherein X is a catalytically active component comprising Co and any one or a mixture of two or more selected from the group consisting of Ni, Ru, and Rh, Y is a promoter Zr, and a and b are real numbers showing weight proportions of X and Y, respectively.

2. The monolith catalyst of claim 1, wherein, in Chemical Formula 1, a is 1 and b is in a range of 0.2 to 1.5.

3. The monolith catalyst of claim 1, wherein the sintering inhibition layer is formed by coating the surface of the monolith support with at least one selected from the group consisting of Al, S, and P.

4. The monolith catalyst of claim 1, wherein the monolith support has 100 to 400 cpsi (cells per square inch).

5. A method of manufacturing a monolith catalyst for reforming methane, the method comprising:

a) dipping a monolith support in a precursor solution of at least one element, wherein the at least one element is selected from elements belonging to Group 13 Group 15, or Group 16, and the at least one element belongs to Period 3 or higher;

b) drying the monolith support obtained in step a);

c) firing the monolith support dried in step b) to form a sintering inhibition layer on a surface of the monolith support;

d) preparing a metal precursor solution including a compound of Chemical Formula 1 below;

e) supporting the metal precursor solution of step d) on the monolith support coated with the sintering inhibition layer obtained in step c);

f) drying the monolith support having the compound of Chemical Formula 1 supported thereon obtained in step e); and g) firing the monolith support dried in step f) to form a catalytically active layer on a surface of the monolith support obtained in step c), wherein the catalytically active layer includes a compound of Chemical Formula 1

$$a(X)-b(Y) \qquad \text{[Chemical Formula 1]}$$

wherein,

X is a catalytically active component comprising Co and any one or a mixture of two or more selected from the group consisting of Ni, Ru, and Rh, Y is a promoter Zr, and a and b are weight proportions of X and Y, respectively, a being 1, and b ranging from 0.2 to 1.5, the precursor solution in step a) does not contain an alumina sol, the catalytically active layer is sequentially formed on the sintering inhibiting layer, and content of the active metal layer has 0.5 to 2 parts by weight based on 100 parts by weight of the monolith support before dipping in step a).

6. The method of claim 5, wherein a precursor of the element in step a) comprises Al, P or S.

7. The method of claim 5, wherein steps a) and b) and steps e) and f) are repeated until a desired amount is obtained.

8. The method of claim 5, wherein the monolith support comprises a ceramic, silicon carbide or metal component having a specific surface area of 10 m²/g or less.

9. The method of claim 5, wherein the firing in step c) is performed at 300 to 600° C. for 3 to 7 hr.

10. The method of claim 5, wherein the firing in step g) is performed at 300 to 600° C. for 3 to 7 hr.

11. A method of manufacturing a synthesis gas, the method comprising reforming a gas mixture including carbon dioxide and methane using the catalyst of claim 1 to thereby manufacture a synthesis gas including carbon monoxide and hydrogen.

12. The method of claim 11, wherein the gas mixture including carbon dioxide and methane is reformed at 800 to 1200° C. under atmospheric pressure, whereby the synthesis gas including carbon monoxide and hydrogen is manufactured.

* * * * *